United States Patent [19]

Song

[11] Patent Number: 5,796,449
[45] Date of Patent: Aug. 18, 1998

[54] ACTIVE MATRIX LIQUID CRYSTAL DISPLAY WITH ONE REPAIR LINE ABOVE PROTECTIVE LAYER AND ONE BELOW

[75] Inventor: In Duk Song, Kyungsangbuk-do, Rep. of Korea

[73] Assignee: LG Electronics Inc., Seoul, Rep. of Korea

[21] Appl. No.: 662,168

[22] Filed: Jul. 11, 1996

[30] Foreign Application Priority Data

Jul. 11, 1995 [KR] Rep. of Korea ................ 20380/1995

[51] Int. Cl.$^6$ ................................................ G02F 1/1343
[52] U.S. Cl. .......................... 349/54; 349/192; 349/122; 349/139
[58] Field of Search ........................ 349/139, 122, 349/54, 192

[56] References Cited

U.S. PATENT DOCUMENTS

| | | | |
|---|---|---|---|
| 4,807,973 | 2/1989 | Kawasaki | 349/192 |
| 5,285,301 | 2/1994 | Shirahashi et al. | 349/192 |
| 5,471,329 | 11/1995 | Nakajima et al. | 349/192 |
| 5,608,558 | 3/1997 | Katsumi | 349/192 |

Primary Examiner—William L. Sikes
Assistant Examiner—Kenneth Parker
Attorney, Agent, or Firm—Morgan, Lewis & Bockius LLP

[57] ABSTRACT

A liquid crystal display having with first and second repair lines with the second repair lines above the protective film connected to the first through a contact hole. The display includes a substrate; a plurality of gate lines disposed in one direction on the substrate, the gate lines having gate electrodes; first repair lines disposed on peripheral sides of the cell array, the first repair lines disposed parallel to the gate lines; a gate insulating layer disposed on the substrate, the gate lines and the first repair line, the gate insulating layer having first contact holes on ends of the first repair line; a plurality of data lines disposed on the gate insulating layer, the data lines being disposed perpendicular to the gate lines; a protective layer disposed on the gate insulating layer and the data lines, the protective layer having second contact holes disposed over the first contact holes; and second repair lines disposed on peripheral sides of the cell array and connected to the first repair line through the first and second contact holes, the second repair line being disposed perpendicular to the data lines.

18 Claims, 6 Drawing Sheets

III - III

ACTIVE MATRIX LIQUID CRYSTAL DISPLAY WITH ONE REPAIR LINE ABOVE PROTECTIVE LAYER AND ONE BELOW

BACKGROUND OF THE INVENTION

1. Field of the Invention

The present invention relates to a liquid crystal display, and more particularly, to a liquid crystal display having a repair line formed in a peripheral region of a cell array.

2. Discussion of the Related Art

Figure 1:
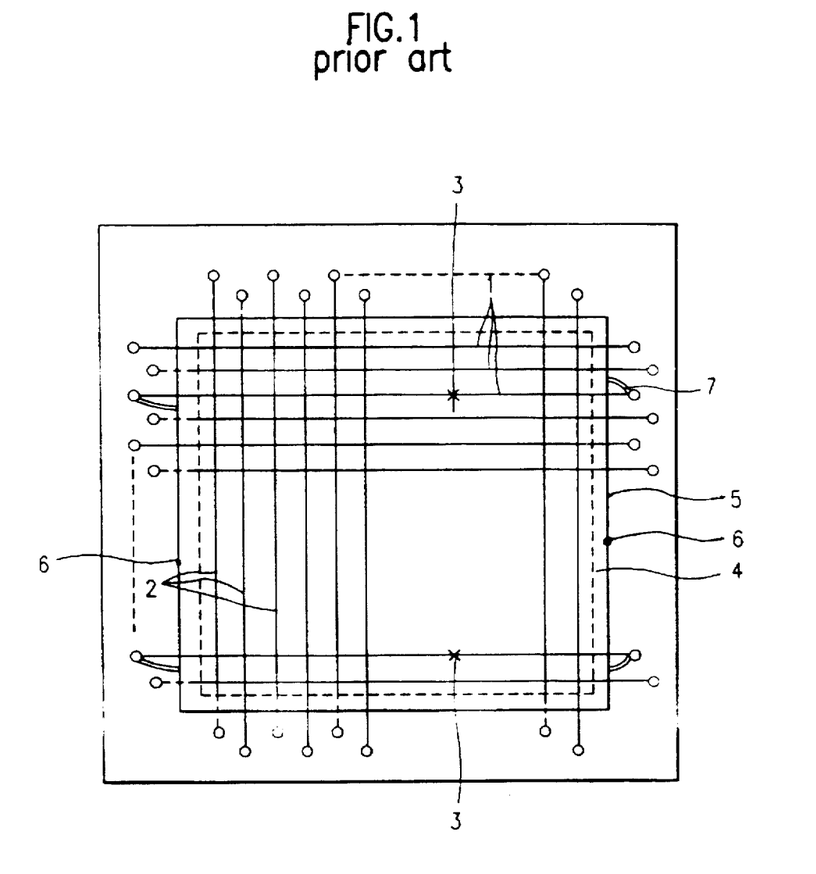
FIG. 1 is a plan view of a repair line of a conventional liquid crystal display having a repair line.

A conventional repair line of a liquid crystal display is shown in FIG. 1. The conventional repair line of the liquid crystal display is constructed having a plurality of gate lines 1 arranged in one direction at predetermined intervals, a plurality of data lines 2 at predetermined intervals arranged perpendicular to gate lines 1, and a plurality of display elements (such as pixel electrodes and thin film transistors) (not shown in FIG. 1). The display elements are formed at the intersections of the respective gate lines and data lines, thereby forming a cell array region 4. In this arrangement, if one of gate lines 1 or data lines 2 has an opening 3, a signal is not applied to the open line. Accordingly, the open line is not available for display, and the resolution of the liquid crystal display is deteriorated.

Accordingly, to overcome this problem, a repair line 5 is formed in the peripheral region of cell array 4 to intersect with gate lines 1 and data lines 2. Here, repair line 5 has a closed circuit or two open points 6. In the structure in which repair line 5 is formed, when the opening 3 occurs on gate lines 1 or data lines 2, the open signal line (gate line 1 in case of FIG. 1) and repair line 5 are connected to each other using a conductor 7 at the intersection of repair line 5 and the open signal line in the peripheral region of cell array 4. As a result, the signal line which is divided into two lines due to open 3, is re-connected by repair line 5. Thus, the two lines are connected to form one signal line so that a signal is applied to an open line opposite to the above open signal line, thereby repairing the open.

Figure 2:
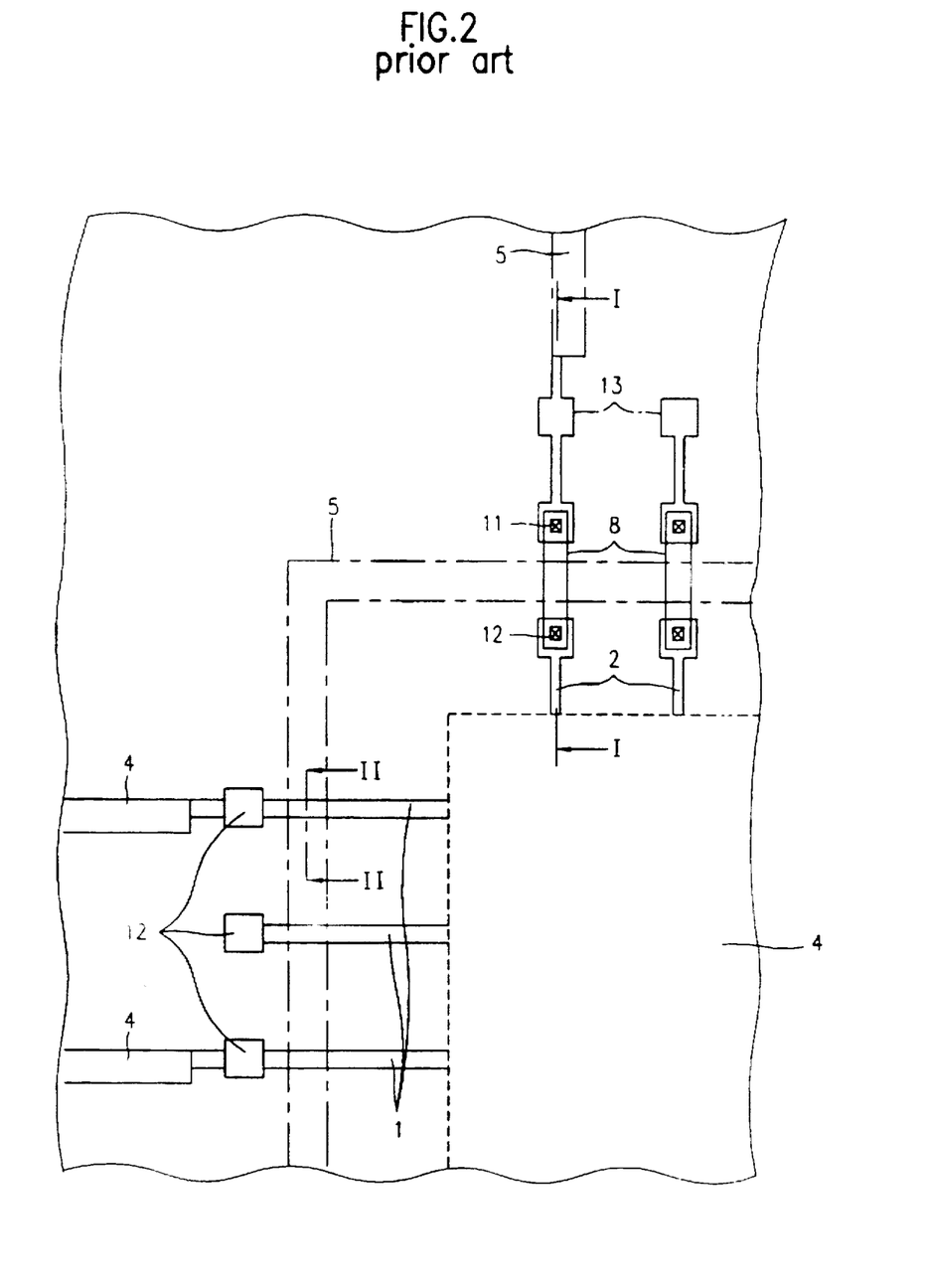
FIG. 2 is a partial plan view of a conventional liquid crystal display having a repair line.
Figure 3:
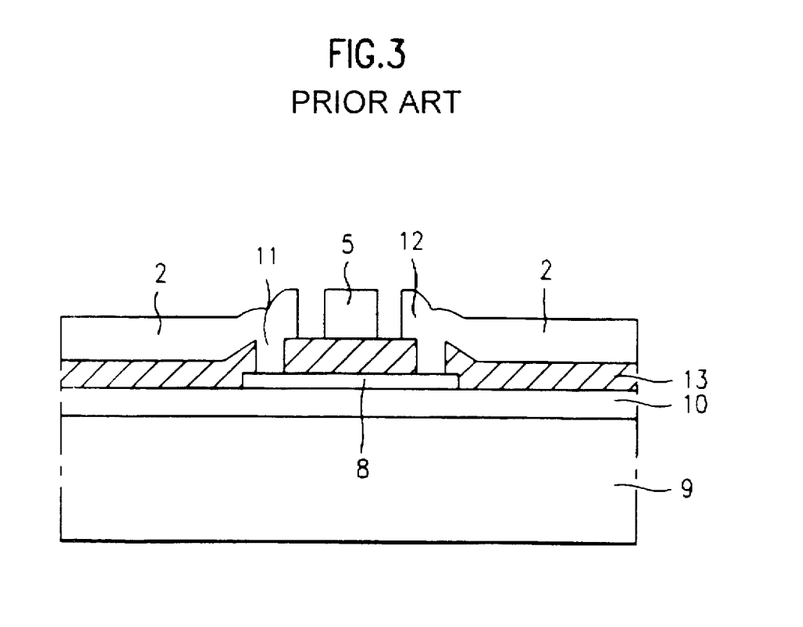
FIG. 3 is a cross-sectional view taken along line I—I of FIG. 2.

The conventional repair line 5 for repairing an open signal line and the structure of the intersection of the repair line and the gate line or data line will now be explained with reference to the accompanying drawings. FIG. 2 is a partial plan view of the conventional repair line. FIG. 3 is a cross-sectional view taken along line I—I of FIG. 2, and FIG. 4 is a cross-sectional view taken along line II—II of FIG. 2.

As shown in FIG. 2, repair line 5 and gate line 1 are formed intersecting each other, and repair line 5 and data line 2 are formed having identical heights at their intersection. Accordingly, data line 2 is not continuous at the intersection with repair line 5, and thus the data line 2 is constructed to be connected through conductive layer 8.

As shown in FIG. 3, at the intersection of repair line 5 and data line 2, a buffer insulating layer 10 is formed on a substrate 9, and conductive layer 8 is selectively formed on the buffer insulating layer 10 placed at the intersection. A gate insulating layer 13 having contact holes 11 and 12 on both sides of conductive layer 8 is formed on the overall surface of the substrate including conductive layer 8, and repair line 5 and data line 2 are formed on gate insulating layer 13 perpendicular to each other. Here, repair line 5 and data line 2 are isolated from each other, and data lines 2 formed on both sides of repair line 5 are connected to each other through contact holes 11 and 12 and conductive layer 8.

Figure 4:
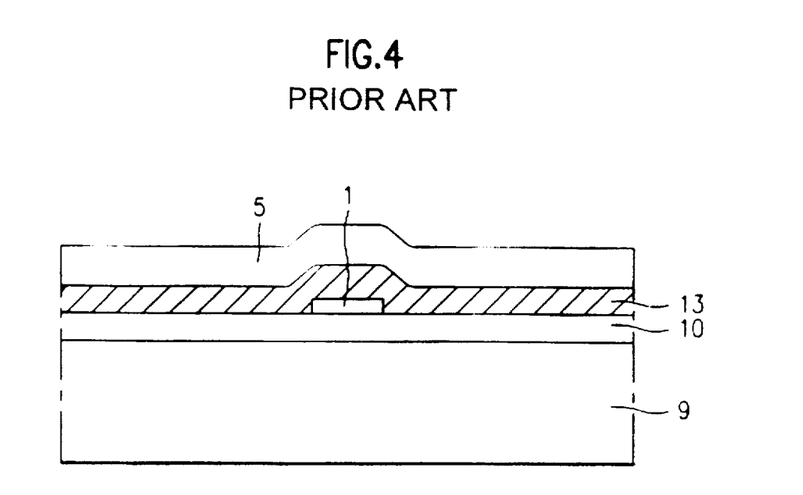
FIG. 4 is a cross-sectional view taken along line II—II of FIG. 2.

On the other hand, as shown in FIG. 4, the structure of the intersection of repair line 5 and gate line 1 is constructed in a manner that gate line 1 is formed on buffer insulating layer 10 in one direction, and gate insulating layer 13 is formed on the overall surface of the substrate including gate line 1. Repair line 5 is formed on gate insulating layer 13 perpendicular to gate line 1.

Figure 5:
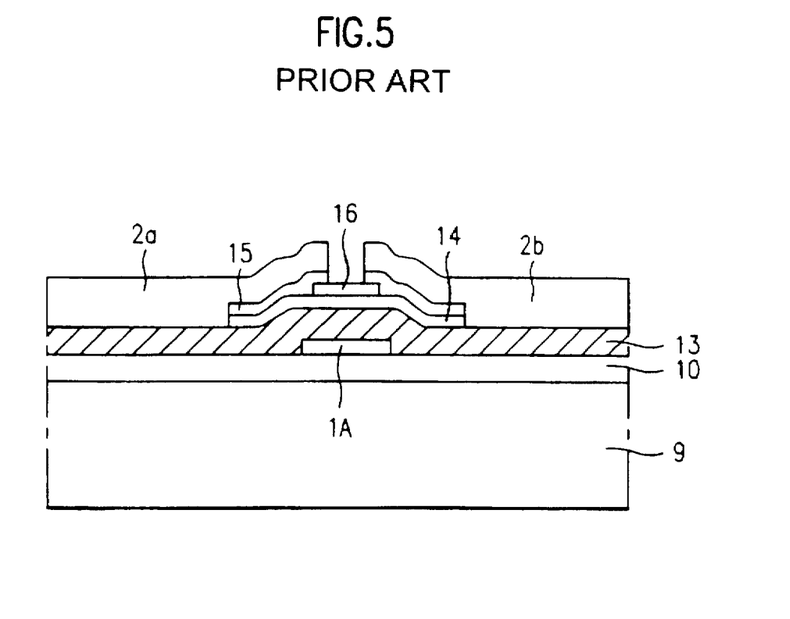
FIGS. 5 and 6 are cross-sectional views of a thin film transistor of a conventional liquid crystal display having a repair structure.
Figure 6:
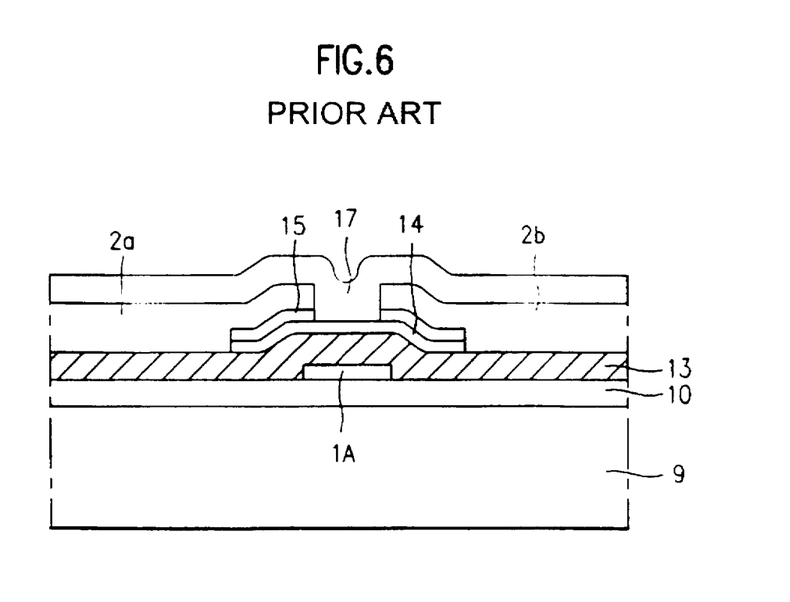

FIGS. 5 and 6 are cross-sectional views of a thin film transistor of the conventional liquid crystal display having the repair structure. The thin film transistor is constructed in a manner that buffer insulating layer (oxide layer) 10 is formed on glass substrate 9, and gate 1A is formed on buffer insulating layer 10. Gate insulating layer 13 is formed on the overall surface of the substrate 9, and a semiconductor active layer 14 is formed on gate insulating layer 13. An ohmic contact layer 15 is formed on both sides of semiconductor active layer 14, and source and drain electrodes 2a and 2b are formed over ohmic contact layer 15 on both sides of semiconductor active layer 14. Here, gate electrode 1A is formed integrally with gate line 1, and source electrode 2a is formed integrally with data line 2.

FIG. 5 shows a case that an etch stopper 16 is formed on semiconductor active layer 14 in a channel region in order to selectively remove only ohmic contact layer 15 from semiconductor active layer 14 and ohmic contact layer 15 in the channel region. FIG. 6 shows the case where, source and drain electrodes 2a and 2b are formed without formation of the etch stopper, and then a protective layer 17 is formed on the overall surface of the substrate.

A method for fabricating the conventional liquid crystal display having the repair line will be explained below with reference to FIGS. 3 to 6. Buffer insulating layer (oxide layer) 10 is formed on glass substrate 9, and a metal line aluminum is deposited on the overall surface of the substrate and selectively removed, thereby simultaneously forming gate line 1 having gate electrode 1A and conductive layer 8 for connecting the data lines to each other. Then, gate insulating layer 13 is formed on the overall surface of the substrate, a semiconductor layer and $n^+$ semiconductor layer are sequentially formed on gate insulating layer 13 and then selectively removed, thereby forming semiconductor active layer 14 and ohmic contact layer 15 on gate insulating layer 13 placed over gate electrode 1A.

Thereafter, contact holes 11 and 12 are formed on both sides of conductive layer 8, and metal is deposited on the overall surface of the substrate. The metal is selectively removed, thereby simultaneously forming data line 2 with a source electrode 2a and a drain electrode 2b perpendicular to gate line 1, and forming repair line 5 in the peripheral region of cell array 4. In the aforementioned conventional liquid crystal display, in case that the gate line or data line is open, failure in display due to the open is overcome by connecting the open line to the repair line, as shown in FIG. 1.

However, a liquid crystal display having the conventional repair line has following problems. First, the repair line and the gate line or data line are isolated from each other only by the gate insulating layer at the intersection of the repair line and the gate line or data line. Accordingly, in case that a signal is applied to the respective lines after the repair, a parasitic capacitance employing the gate insulating layer as its dielectric is produced between the gate line and the repair line or repair line at their intersection. As a result, the signal applied to the respective lines accumulates charges in the parasitic capacitor as they pass through the intersection. This considerably reduces the signal voltage or current, thereby deteriorating the picture quality of the liquid crystal display.

Second, since the data lines placed on both sides of the repair line are connected to each other through the conductive layer at the intersection of the repair line and data line, a large number of contact holes are required. Accordingly, the fabrication process becomes complicated and misalignment may occur, thereby decreasing the yield.

SUMMARY OF THE INVENTION

Accordingly, the present invention is directed to a liquid crystal display and method for fabricating the same that substantially obviates one or more of the problems due to limitations and disadvantages of the related art.

It is an object of the present invention to provide a liquid crystal display and a method for fabricating the same in which reduction of a signal due to parasitic capacitance is mitigated and the fabrication process is simplified.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the liquid crystal display having a cell array includes a substrate; a plurality of gate lines disposed in one direction on the substrate, the gate lines having gate electrodes; first repair lines disposed on peripheral sides of the cell array, the first repair lines disposed parallel to the gate lines; a gate insulating layer disposed on the substrate, the gate lines and the first repair line, wherein the gate insulating layer has first contact holes on ends of the first repair line; a plurality of data lines disposed on the gate insulating layer, the data lines being disposed perpendicular to the gate lines; a protective layer disposed on the gate insulating layer and the data lines, the protective layer having second contact holes disposed over the first contact holes; and second repair lines disposed on peripheral sides of the cell array and connected to the first repair line through the first and second contact holes, the second repair line being disposed perpendicular to the data lines.

In another aspect, the present invention provides a liquid crystal display having a cell array including the steps of forming a plurality of gate lines having gate electrodes on the substrate arranged in first direction, and forming first repair lines in peripheral regions of the cell array parallel to the gate lines; forming a gate insulating layer on the substrate, the gate lines and first repair lines; forming semiconductor layers on the gate insulating layer above the gate electrodes; forming a plurality of data lines perpendicular to the gate lines and connected to respective semiconductor layers; forming a protective layer on the gate insulating layer, the semiconductor layers, and the data lines; forming contact holes on ends of the first repair lines; and forming second repair lines perpendicular to the data lines and connected to the first repair lines through the contact holes.

In another aspect, the present invention provides a liquid crystal display having a repair line formed in a peripheral region of its cell array and intersecting its gate and data lines, the liquid crystal display including: a substrate; a plurality of gate lines formed in one direction on the substrate, the gate lines having gate electrodes, a first repair line formed on both sides of the cell array, the first repair line being formed in parallel to the gate lines; a gate insulating layer formed on the overall surface of the substrate including the gate lines and first repair line, the gate insulating layer having a first contact hole on both sides of the first repair line; a is plurality of data lines formed on the gate insulating layer, the data lines being formed in perpendicular to the gate lines; a protective layer formed on the overall surface of the substrate including the data lines, the protective layer having a second contact hole in the same position as that of the first contact hole; and a second repair line formed on both sides of the cell array and connected to the first repair line through the first and second contact holes, the second repair line being formed in perpendicular to the data lines.

In a further aspect, the present invention provides a method for fabricating a liquid crystal display having a repair line formed in a peripheral region of its cell array and intersecting its gate and data lines, the method comprising the steps of: preparing a substrate; forming a plurality of gate lines having gate electrodes on the substrate to be arranged in one direction, and simultaneously forming a first repair line in the peripheral region of the cell array in parallel to the gate lines; forming a gate insulating layer on the overall surface of the substrate including the gate lines and first repair line; forming a semiconductor layer on the gate insulating layer placed over the gate electrode; forming a plurality of data lines in perpendicular to the gate lines and connected to the semiconductor layer; forming a protective layer on the overall surface of the substrate including the date lines; and forming a contact hole on both sides of the first repair line, and forming a second repair line in perpendicular to the data lines and connected to the first repair line through the contact hole.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF PREFERRED EMBODIMENT

Reference will now be made in detail to the preferred embodiments of the present invention, examples of which are illustrated in the accompanying drawings.

Figure 7:
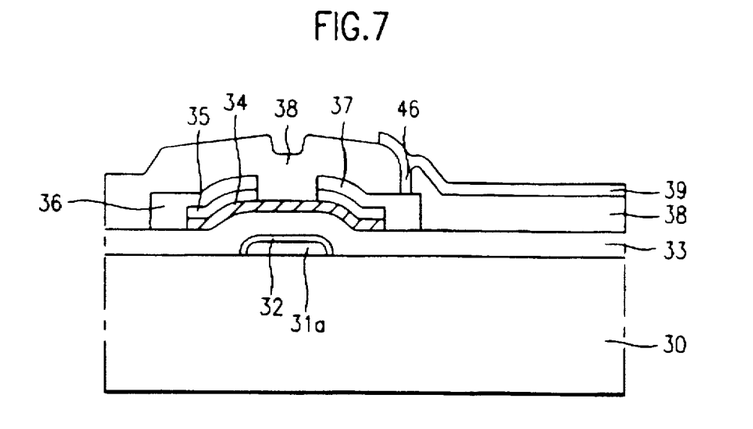
FIG. 7 is a cross-sectional view of a thin film transistor of a liquid crystal display according to the present invention.
Figure 8:
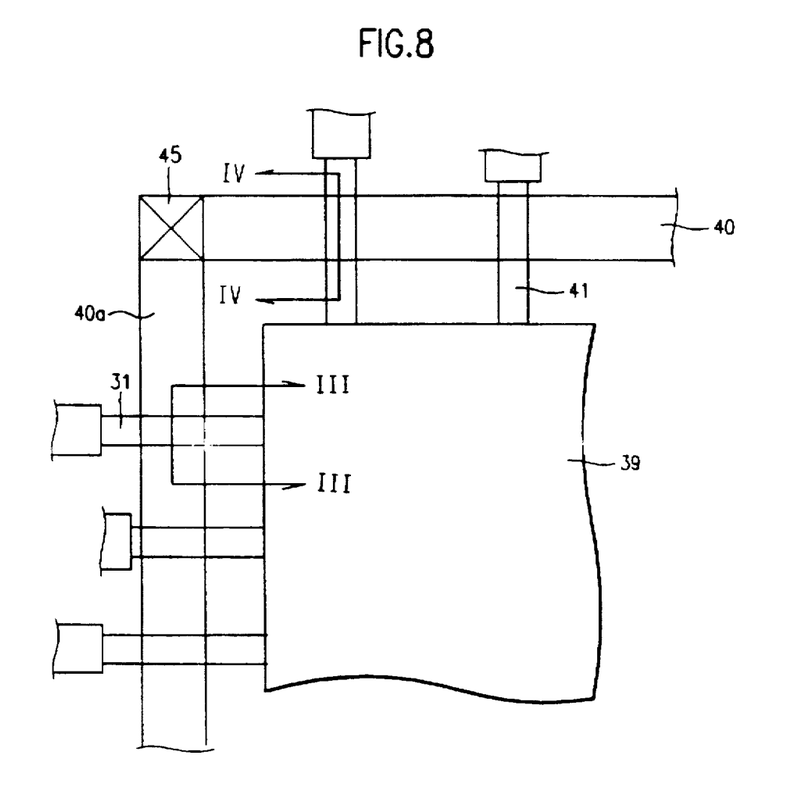
FIG. 8 is a simplified plan view of a repair structure according to the present invention.
Figure 9:
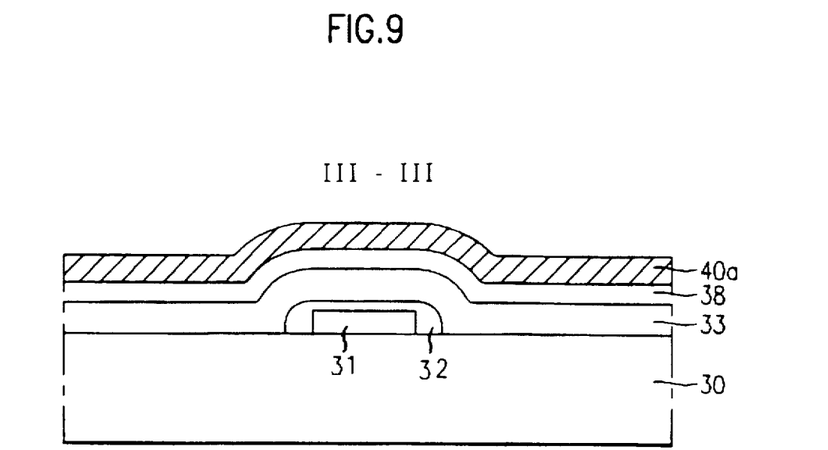
FIG. 9 is a cross-sectional view taken along line III—III of FIG. 8.
Figure 10:
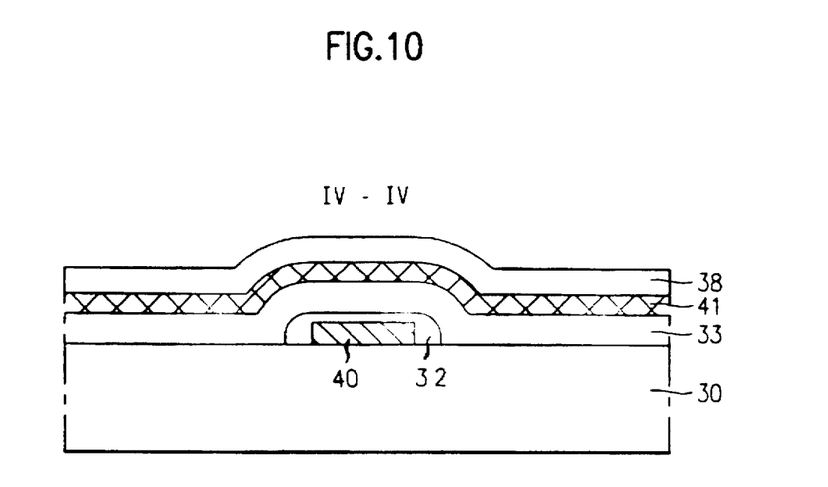
FIG. 10 is a cross-sectional view taken along line IV—IV of FIG. 8.

A preferred embodiment of the present invention will be explained below with reference to the accompanying drawings. FIG. 7 is a cross-sectional view of a thin film transistor of a liquid crystal display according to the present invention. FIG. 8 is a simplified plan view of a repair structure according to the present invention. FIG. 9 is a cross-sectional view taken along line III—III of FIG. 8. FIG. 10 is a cross-sectional view taken along line IV—IV of FIG. 8.

As shown in FIGS. 7 and 8, the liquid crystal display of the present invention includes a plurality of gate lines 31 having a predetermined interval from one another arranged in one direction, and a plurality of data lines 41 having a predetermined interval from one another arranged perpendicular to the gate lines 31. Repair lines 40 and 40a are formed in a peripheral region of a cell array 39 with gate lines 31 and data lines 41, and intersect with gate lines 31 and data lines 41. Here, repair lines 40 and 40a may have either a closed circuit or two open points.

Repair lines 40 and 40a include a first repair line 40 and second repair line 40a. First repair line 40 is parallel to gate lines 31, and second repair line 40a is parallel to data lines 41. First repair line 40 and gate lines 31 are preferably formed of identical materials, and formed having identical heights. Second repair line 40a is preferably formed of the same material as that of the pixel electrodes. Accordingly, in order to mitigate the reduction of a signal due to the capacitance between the signal lines and the repair lines, the pixel electrode 39 is formed after a protective layer 38 is formed in the fabrication of a thin film transistor of the liquid crystal display. As a result, a gate insulating layer 33 and protective layer 38 are formed at the intersection between gate lines 31 and second repair line 40a, to increase the thickness of dielectric layers, i.e., the gate insulating layer and the protective layer, of the capacitor. Thus, the capacitance is reduced corresponding to the thickness of the protective layer 38.

In the liquid crystal display of the present invention, gate line 31 having gate electrode 31a and first repair line 40 are formed of a metal, such as aluminum, on a glass substrate 30. An anodized film 32 is formed on the surface of gate line 31 having gate electrode 31a, and first repair line 40. A gate insulating layer 33 is formed on the overall surface of substrate 30 on which gate line 31 and first repair line 40 are formed, to have a first contact hole 45 on both ends of first repair line 40. A semiconductor active layer 34 is formed on gate insulating layer 33 placed over gate electrode 31a, and an ohmic contact layer 35 is formed on both sides of semiconductor active layer 34. Data line 41 is formed perpendicular to gate line 31 having source electrode 36 connected to one side of ohmic contact layer 35 and semiconductor active layer 34. Drain electrode 37 is connected to the other side of ohmic contact layer 35 and semiconductor active layer 34.

Protective layer 38 is formed on the overall surface of the substrate to have a third contact hole 47 (not shown) on a portion in which first contact hole 45 formed in gate insulating layer 33, and second contact hole 46 exposing a predetermined portion of drain electrode 37 are located. Pixel electrode 39 is formed on a pixel region on protective layer 38 and connected to drain electrode 37 through second contact hole 46. Second repair line 40a is formed in the peripheral region of cell array 39 parallel to the data line to be connected to first repair line 40 through first and third contact holes 45 and 47, thereby forming a closed circuit.

The structure of the liquid crystal display of the present invention will now be explained by dividing it into a thin film transistor region, a region in which first repair line 40 and data line 41 intersect each other, and a region in which second repair line 40a and gate line 31 intersect each other. First, as shown in FIG. 7, the thin film transistor region is constructed in such a manner that the gate line 31 having gate electrode 31a is formed on glass substrate 30, and anodized film 32 is formed on the surface of gate electrode 31a. Gate insulating layer 33 is formed on the overall surface of the substrate, and semiconductor active layer 34 is formed on gate insulating layer 33 placed over gate electrode 31a. Ohmic contact layer 35 is formed on both sides of semiconductor active layer 34, and source and drain electrodes 36 and 37 are formed on both sides of ohmic contact layer 35 and semiconductor active layer 34. Protective layer 38 is formed on the overall surface of the substrate having second contact hole 46 which exposes a predetermined portion of drain electrode 37. Pixel electrode 39 is formed on a pixel region of protective layer 38 and connected to drain electrode 37 through second contact hole 46.

As shown in FIG. 9, the region in which gate line 31 and second repair line 40a intersect each other is constructed such that gate line 31 is formed on substrate 30, and anodized film 32 is formed on the surface of the gate line 31. Gate insulating layer 33 is formed on the overall surface of the substrate, and protective layer 38 is formed on gate insulating layer 33. Second repair line 40a is formed on protective layer 38.

As shown in FIG. 10, the region in which data line 41 and first repair line 40 intersect each other is constructed such that first repair line 40 is formed on substrate 30, and anodized film 32 is formed on the surface of first repair line 40. Gate insulating layer 33 is formed on the overall surface of the substrate, and data line 41 is formed on gate insulating layer 33. The protective layer 38 is formed on data line 41. That is, as shown in FIG. 10, first repair line 40 is isolated from data line 41 by gate insulating layer 33 but second repair line 40a is isolated from gate line 31 by gate insulating layer 33 and protective layer 38.

A method for fabricating the above mentioned liquid crystal display according to the present invention will be explained below with reference to FIGS. 7–10. First, a metal, such as aluminum, is deposited on substrate 30, and selectively removed to form gate line 31 having gate electrode 31a, and first repair line 40. Then, gate line 31 having gate electrode 31a, and first repair line 40 are anodized to form anodized film 32 on their surface, and gate insulating layer 33 is formed on the overall surface of the substrate. Thereafter, semiconductor active layer 34 and ohmic contact layer 35 are sequentially formed on gate insulating layer 33, and patterned to be left only on gate electrode 31a.

A metal layer is formed on the overall surface of the substrate and selectively removed to form data line 41 having source electrode 36, and drain electrode 37. Then, ohmic contact layer 35 placed on a channel region is removed using source electrode 36 and drain electrode 37 as a mask. Protective layer 38 is formed on the overall surface of the substrate, and selectively removed to expose drain electrode 37, to form second contact hole 46. Here, protective layer 38 and gate insulating layer 33 can be formed of identical materials. Also, it is preferable to form the protective layer 38 by a thickness of over one half that of the gate insulating layer 33.

Next, in order to connect first repair line 40 to second repair line 40a, a predetermined portion of protective layer 38 and gate insulating layer 33 are selectively etched to expose both sides of first repair line 33, thereby forming first and third contact holes 45 and 47. A transparent conductive layer is formed on protective layer 38, and patterned to form pixel electrode 39 and second repair line 40. Accordingly, in the repair structure of the present invention, the gate insulating layer 33 and protective layer 38 are formed between the repair line and signal lines at their intersection. That is, gate insulating layer 33 and protective layer 38 are formed at the intersection of gate line 31 and second repair line 40a, and the gate insulating layer is formed at the intersection of data line 41 and first repair line 40.

As described above, the liquid crystal display and the method for fabricating the same according to the present invention have following advantages. First, the gate lines and repair line are isolated from each other according to the gate insulating layer and protective layer at their intersection in the peripheral region of the cell array. As a result, when an external signal is applied to the respective gate lines passing through the intersection of the signal lines and repair line after the repair, the signal reduction due to the capacitance is minimized by decreasing the capacitance corresponding to the thickness of the protective layer. This minimizes any negative effect in the picture quality of the liquid crystal display. Second, unlike the conventional liquid crystal display in which four contact holes are required for one data line, the present invention requires four contact holes for connecting the first and second repair lines to each other. This considerably reduces the number of contact holes so that the process is simplified, thereby improving the yield.

It will be apparent to those skilled in the art that various modifications and variations can be made in the liquid crystal display and method for fabricating the same of the present invention without departing from the spirit or scope of the invention. Thus, it is intended that the present invention cover the modifications and variations of this invention provided they come within the scope of the appended claims and their equivalents.

What is claimed is:

1. A liquid crystal display having a cell array, the liquid crystal display comprising:
    a substrate;
    a plurality of gate lines in one direction on the substrate, the gate lines having gate electrodes;
    first repair lines on peripheral sides of the cell array, the first repair lines disposed parallel to the gate lines;
    a gate insulating layer on the substrate, the gate lines and the first repair line, the gate insulating layer having a first contact hole at end portions of the first repair line;
    a plurality of data lines on the gate insulating layer, the data lines being substantially perpendicular to the gate lines;
    a protective layer on the gate insulating layer and the data lines, the protective layer having a second contact hole over the first contact hole; and
    second repair lines on peripheral sides of the cell array and connected to the first repair line through the first and second contact holes, the second repair line being perpendicular to the data lines.

2. The liquid crystal display according to claim 1, further comprising a semiconductor layer on the gate insulating layer over the gate electrode.

3. The liquid crystal display according to claim 1, further comprising an anodized film on the surface of the gate lines.

4. The liquid crystal display according to claim 1, further comprising a pixel electrode over the protective layer, the pixel electrode and the second repair line having a substantially identical material.

5. The liquid crystal display according to claim 1, wherein the first repair line and the gate lines include substantially identical material.

6. The liquid crystal display according to claim 1, wherein the gate insulating layer and the protective layer include substantially identical material.

7. The liquid crystal display according to claim 1, wherein the protective layer has a thickness of more than one half of a thickness of the gate insulating layer.

8. The liquid crystal display according to claim 1, wherein the gate lines are continuous at intersections with the first repair lines and the data lines are continuous at intersections with the second repair lines.

9. The liquid crystal display according to claim 1, wherein the first repair lines and the gate lines have substantially identical heights.

10. A method for fabricating a liquid crystal display on a substrate having a cell array, the method comprising the steps of:
    forming a plurality of gate lines having gate electrodes on the substrate arranged in a first direction;
    forming first repair lines in peripheral regions of the cell array parallel to the gate lines;
    forming a gate insulating layer on the substrate, the gate lines, and first repair lines;
    forming semiconductor layers on the gate insulating layer above the gate electrodes;
    forming a plurality of data lines perpendicular to the gate lines and connected to respective semiconductor layers;
    forming a protective layer on the gate insulating layer, the semiconductor layers, and the data lines;
    forming contact holes in the protective layer at end portions of the first repair lines; and
    forming second repair lines perpendicular to the data lines and connected to the first repair lines through the contact holes.

11. The method for fabricating a liquid crystal display according to claim 10, the method further comprising the step of forming an anodized film on surfaces of the gate lines and the first repair lines.

12. The method for fabricating a liquid crystal display according to claim 10, the method further comprising the step of forming a semiconductor active layer and ohmic contact layer on the gate insulating layer over the gate electrodes.

13. The method for fabricating a liquid crystal display according to claim 10, wherein a pixel electrode is simultaneously formed during the step of forming the second repair line.

14. The method for fabricating a liquid crystal display according to claim 10, wherein the gate insulating layer and the protective layer are formed of substantially identical materials.

15. The method for fabricating a liquid crystal display according to claim 10, wherein the protective layer is formed having a thickness more than one half of a thickness of the gate insulating layer.

16. The method for fabricating a liquid crystal display, according to claim 10, wherein the step of forming the first repair lines is performed simultaneously with the step of forming the plurality of gate lines.

17. The method for fabricating a liquid crystal display, according to claim 10, wherein the gate lines are formed to be continuous at intersections with the first repair lines, and the data lines are formed to be continuous at intersections with the second repair lines.

18. The method for fabricating a liquid crystal display according to claim 10, wherein the first repair lines and the gate lines are formed having substantially identical heights.

* * * * *